2 Sheets—Sheet 1.

L. W. PECK.
Lamp Attachment.

No. 215,964. Patented May 27, 1879.

WITNESSES:
Henry N. Miller
C. Sedgwick

INVENTOR:
L. W. Peck
BY
ATTORNEYS.

2 Sheets—Sheet 2.

L. W. PECK.
Lamp Attachment.

No. 215,964. Patented May 27, 1879.

WITNESSES:
Henry N. Miller
C. Sedgwick

INVENTOR:
L. W. Peck
BY Munn & Co
ATTORNEYS.

UNITED STATES PATENT OFFICE.

LOUIS W. PECK, OF MINNEAPOLIS, MINNESOTA.

IMPROVEMENT IN LAMP ATTACHMENTS.

Specification forming part of Letters Patent No. 215,964, dated May 27, 1879; application filed February 8, 1879.

*To all whom it may concern:*

Be it known that I, L. W. PECK, of Minneapolis, Hennepin county, in the State of Minnesota, have invented an Improvement in Lamp Attachments, of which the following is a specification.

Figure 1:
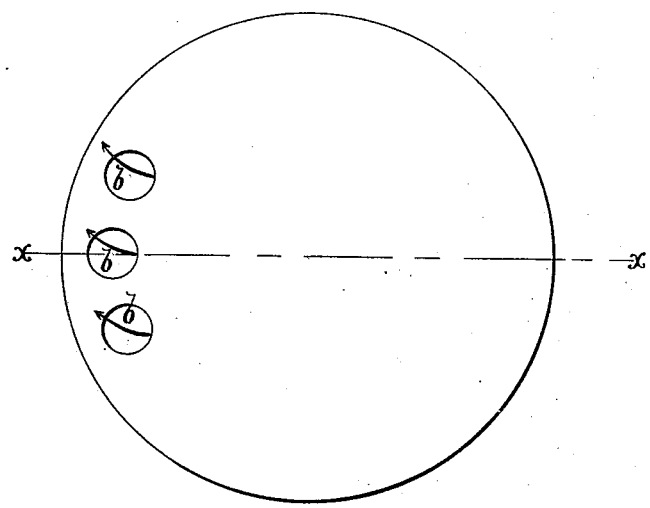
Figure 2:
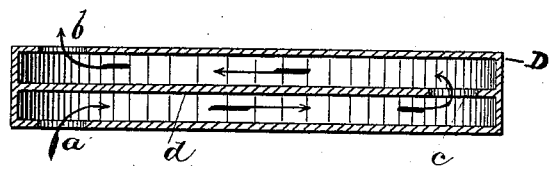
Figure 3:
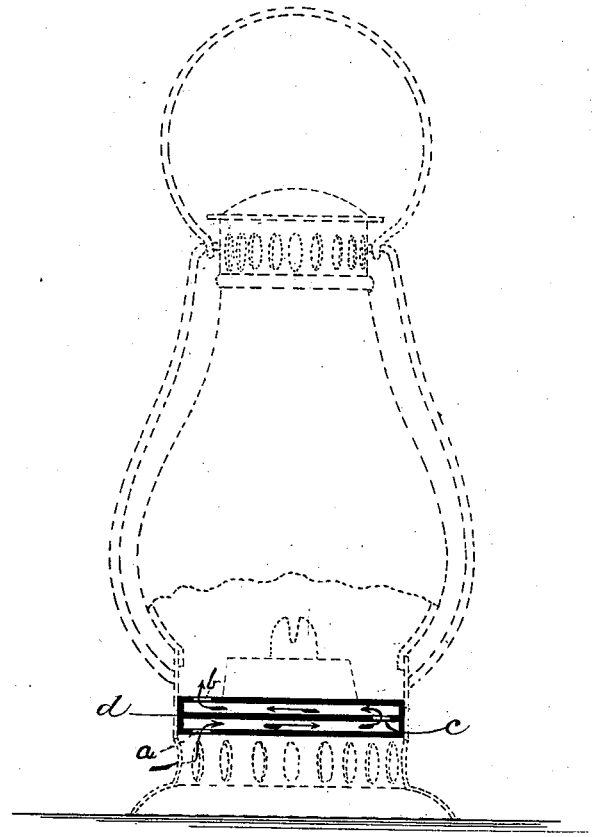

Figure 1 of the drawings is a plan view, and Fig. 2 a diametrical cross-section. Fig. 3 shows my device applied to a lantern.

The object of the invention is to prevent combustible dust from entering the flame of lamps or lanterns; and the invention consists in a peculiar construction by which this may be accomplished with better effect than by the means at present known to the public.

In the drawings, D represents the hollow tube or box through which I cause the air to pass before it reaches the flame or combustion space of the lamp or lantern, and $d$ a diaphragm which separates the tube or box into two parts or chambers. The air is first admitted through one or more apertures, $a$; then caused to traverse nearly the whole length of the tube or box; next allowed to pass through the diaphragm at one or more holes, $c$, and then forced to travel back the same distance before it is permitted to escape through one or more apertures, $b$. The effect of this is to produce a deposit of the combustible dust before the air reaches the flame.

I am aware that it is not broadly new to cause the air to pass around angles and against friction-surfaces; but

What I claim is—

In combination with a lamp or lantern, the tube or box D, having the diaphragm $d$ and apertures $b$ $c$ $a$, arranged as shown and described.

LOUIS W. PECK.

Witnesses:
    CHAS. Y. LACY,
    WM. F. PECK.